(12) United States Patent
Miyamoto

(10) Patent No.: US 6,667,939 B1
(45) Date of Patent: Dec. 23, 2003

(54) OPTICAL DISK AND OPTICAL RECORDING APPARATUS FOR SAID DISK

(75) Inventor: Harukazu Miyamoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 09/665,044

(22) Filed: Sep. 19, 2000

(30) Foreign Application Priority Data

Sep. 18, 2000 (JP) ........................................ 2000-286844

(51) Int. Cl.[7] ................................................ G11B 7/00
(52) U.S. Cl. .................................. 369/53.21; 369/59.25
(58) Field of Search ......................... 369/59.21, 59.24, 369/59.25, 275.2, 275.5, 53.21

(56) References Cited

U.S. PATENT DOCUMENTS

| 5,805,565 A | 9/1998 | Miyamoto et al. |
| 5,936,933 A | 8/1999 | Miyamoto et al. |
| 6,269,063 B1 * | 7/2001 | Fujinami et al. ......... 369/53.44 |
| 6,289,423 B1 * | 9/2001 | Ozaki et al. ............. 369/275.3 |
| 6,434,099 B1 * | 8/2002 | Yoshimoto et al. ...... 369/53.21 |

* cited by examiner

*Primary Examiner*—Nabil Hindi
(74) *Attorney, Agent, or Firm*—Mattingly, Stanger & Malur, P.C.

(57) ABSTRACT

An optical disc drive system can process both a rewritable optical disc having a plurality of data recording unit areas freely rewritable and an optical disc with a data protection function having the same format as the rewritable optical disc and having a different address data size to limit data rewrite and data write-once. The optical disc with the data protection function has address data different from that used by an optical disc drive system without the erroneous read/write and erase protection function. Even if a data protection function is introduced to an already existing optical disc drive system, an already existing optical disc drive system without the data protection function will not destroy data on an optical disc with the data protection function.

14 Claims, 6 Drawing Sheets

OPTICAL DISK AND OPTICAL RECORDING APPARATUS FOR SAID DISK

BACKGROUND OF THE INVENTION

1. Field of the Invention

The present invention relates to an optical disc drive system capable of processing both an optical disc having a data protection function for preventing data from miss-erasure and alteration and an optical disc without such a data protection function.

2. Description of the Related Art

An example of a conventional optical disc drive system will be described with reference to FIGS. 3 and 5. FIG. 3 is a block diagram showing an example of a conventional optical disc drive system. Light emitted from a laser 25 (about 660 nm in wavelength for DVD-RAM) constituting a portion of an optical head 2 passes through a collimator lens 24 to be collimated to parallel light beams 22. A light beam 22 is focused upon an optical disk 11 via an objective lens 23 to form a spot 21. The reflected light beam 22 is sent to a servo detector 26 and a signal detector 27 via a beam splitter 28 and a hologram device 29. Signals detected with the detectors are added or subtracted to form servo signals such as a tracking error signal and a focus error signal which are input to a servo circuit. In accordance with the input tracking error signal and focus error signal, the servo circuit controls the positions of the objective lens 31 and optical head 2 to set the optical spot 21 to a target read/write area. An addition signal of signals output from the detector 27 is input to a signal reproduction block 41. The input signal is subjected to filtering and equalizing by a signal processing circuit to be digitized thereafter. This digital signal is processed by an address detector and a demodulator. In accordance with the address signal detected by the address detector, a microprocessor calculates the position of the optical spot 21 on the optical disc 11 and controls an automatic positioning means to move the optical head 2 and optical spot 21 to the target read/write unit area (sector).

If a command from a host to the microprocessor is a write command, the microprocessor receives write data from the host and stores it in a memory, and controls the automatic positioning means to move the optical spot 21 to the target write area. After the microprocessor confirms from the address signal supplied from the signal reproduction block 41 that the optical spot is correctly positioned at the data write area, the microprocessor controls a laser driver and the like to write the data stored beforehand in the memory into the target write area.

As shown in FIG. 6, address data is written in each read/write unit area at the start field thereof. By detecting this address data as the address signal, it is possible to check the position of an optical spot immediately before the data is written.

FIG. 5 is a flow chart illustrating the operation of the optical disc drive system, by taking as an example an optical disc drive system for driving a rewritable type DVD-RAM stipulated by International Standards ISO/IEC-16824.

As a disc is loaded or a power of the optical disc drive system is turned on, the optical disc drive system first executes a process of identifying the type of the medium. This system generally has a read function not only for DVD-RAM media but also for read-only type media such as CD-ROM and DVD-ROM. Therefore, the optical disc drive system first executes the identification process to identify the type of the loaded medium. The identification process changes with each system. For example, one system identifies the medium type from a reflectivity and the analog characteristics of the reproduced signal such as a focus error signal, whereas another system identifies the medium type from the contents (data) read from a disc physical information area in a disk substrate.

If the medium type is identified as a rewritable type, i.e., DVD-RAM, the optical disc drive system reads data recorded in a defect management area to check whether the optical disc is already formatted. If unformatted, it stands by until a format command is supplied from the host or user.

If formatted, the optical disc drive system executes a read/write preparation process such as a calibration process and a logical consistency check process, and thereafter waits for a command from the host or user. Upon reception of any command, the optical disc drive system checks the type of the command. If it is a write command, a write process is executed, whereas if it is a read command, a format command or an eject command, then a corresponding process is executed. These processes are usually terminated normally. However, if the write operation were failed from unexpected reasons, an error process such as a retry process and a replacement process is executed.

Generally, in the case of DVD-RAM, after the write process, the written data is read to verify whether the data was correctly written, and if necessary the replacement process using other read/write unit areas is executed. In this manner, the reliability of written data is improved. Management information on reassignment of read/write unit areas is recorded in a specific area (defect management area) of the disc.

DVD-RAM is used with such a highly reliable optical disc drive system, and data written can be basically rewritten freely. There is, therefore, a possibility that important written data is erased or altered because of miss-operation by a user or a failure by the host.

As one protective method, a so-called "write-protect function" is known. However, this write-protect function" can be released by a user freely. It is therefore impossible to prevent data from being destroyed by a miss-operation of a user.

An example of a magneto optical disc used for solving the above problem will be described. A magneto optical disc is a rewritable type storage medium which can erase or rewrite user data in a user data area. There are needs for using a magneto optical disc as a write-once type storage medium which cannot erase or write user data.

According to CCW System (or MO-WORM System) stipulated in ISO-IEC 11560, media type identification data representative of an magneto optical disc type is recorded in a control data area outside of a user data area. Whether a magneto optical disk is a rewritable type or a write-once type is determined from this media type identification data.

As a write-once type magneto optical disk is loaded, the magneto optical disc drive system inhibits an erase operation and a rewrite operation of the user data area with user data already written. Namely, this system has a data protection function for preventing erase and overwrite of a magneto optical disc which is originally of a rewritable type. The same magneto optical disc drive system can access both the write-once magneto optical disk with the data protection function and the rewritable type magneto optical disc. Application field of the magneto optical disc can be broadened and the media cost can be reduced.

However, if a similar method is applied to the optical disc drive system stipulated only with the rewritable type specifications, such as DVD-RAM, there arise the following problems.

The specifications for rewritable type discs exist already and are prevailing in markets. Optical disc drive systems for driving such optical discs in conformity with those specifications also exist already. Under such environments, even if media type identification data is newly registered in a media type identification area similar to magneto optical discs, the already existing systems cannot be altered and cannot drive optical discs with the data protection function.

Not all optical disc drive systems use the media type identification data for identifying the medium type. Even if new code data still not defined is recorded as the media type identification data, a conventional optical disc drive system cannot recognize the meaning of the code data and the operation becomes undifined.

DVD-ROM is a read-only medium. It generally requires a cost of hundreds of thousands Yen and takes a time of one day or longer to write data in a single DVD-ROM. Therefore, thousands or more of DVD-ROMs are generally formed at a time. DVD-ROMs are used only in the field of mass production.

As described above, even if a data protection function is introduced to an already existing optical disc drive system, an already existing optical disc drive system without the data protection function may destroy data on an optical disc with the data protection function.

SUMMARY OF THE INVENTION

It is an object of the present invention to provide an optical disc drive system capable of realizing a data protection function by changing almost no hardware and physical specifications, and eliminating a possibility that a conventional system not recognizing this expanded function may erase or alter data.

In order to achieve the above object of the invention, the following approaches are incorporated.

(1) An optical disc drive system is provided which can process both a rewritable optical disc and an optical disc with a data protection function limiting data rewrite and data addition. These discs each have a plurality of divided data recording unit areas and have address data of the data recording unit areas in the form of read-only data. Address data of the optical disc with the data protection function is set differently from address data of the rewritable optical disc. The address data of each data recording unit area of the optical disc with the data protection function is related to the address data of the same data recording unit area of the rewritable optical disc through arithmetic or logical addition of a constant.

Even if an optical disc with the data protection function is driven with a conventional optical disc drive system which cannot recognize the data protection function, the conventional optical disc drive system cannot access the target data write area because the target address does not exist at the position expected by the conventional optical disc drive system. There is therefore no risk that the conventional optical disc drive system without the data protection function may erroneously destroy data through erase or overwrite. A high reliability of the data protection function can therefore be improved. The address data of each data recording unit area of the optical disc with the data protection function is related to the address data of the same data recording unit area of the rewritable optical disc through simple arithmetic or logical addition of a constant. Therefore, it is easy to develop a modification or alteration method from a conventional optical disc drive system to an optical disc drive system with the data protection function.

A high reliability optical disc drive system with the data protection function can therefore be supplied with low cost. The main different point between the optical disc drive system with the data protection function of this invention and a conventional optical disc drive system is only address data. It is easy to support the addition of a read/write function for a conventional optical disc drive system without the data protection function to the optical disc drive system with the data protection function of this invention.

(2) In addition to the above, address data of an optical disc with the data protection function is set so as not to exist in the rewritable optical disc.

Even if an optical disc with the data protection function is driven with a conventional optical disc drive system which cannot recognize the data protection function, the conventional optical disc drive system cannot access the target data write area because the target address does not exist at the position expected by the conventional optical disc drive system. There is therefore no risk that the conventional optical disc drive system without the data protection function may erroneously destroy data through erase or overwrite. A high reliability of the data protection function can therefore be improved. Similarly, it becomes easy to add the read/write function of a conventional optical disc drive system and lower the cost. Further, the address data of a conventional optical disc is not overlapped with and is perfectly different from the address data of the optical disc with the data protection function. By utilizing this point, the conventional optical disc and the optical disc with the data protection function can be easily discriminated.

(3) Information for discriminating the optical disc with the data protection function from the rewritable optical disc is recorded in the identification data area outside of a normal user area.

By reading this identification data, the optical disc drive system with the data protection function of this invention can easily discriminate between a conventional optical disc and an optical disc with the data protection function of this invention.

(4) An overwrite protection function is provided which in response to a user data write command from a user or a host after an optical disc with the data protection function is loaded, a read operation for reading the data recording unit area is first executed when user data is to be written in the data recording unit area of the optical disc with the data protection function, a data write operation is inhibited if user data is already written in the data recording unit area, the user data is written in the data recording unit area if user data is not written in the data recording unit area.

Even if there occurs a miss-operation of a user, a defective host or a defective host program, already written data will not be lost so that data archiving is possible with very high reliability. Even if a malicious user intends to alter data, the optical disc drive system of this invention does not allow data overwrite and erase so that record data can be stored with high security.

(5) In the optical disc drive system of this invention, finalization data is written in the optical disc with the data protection function upon reception of a command from a user or a host, a presence/absence of the finalization data is confirmed when an optical disk is loaded, and if there is the finalization data, neither a write-once operation nor a rewrite operation is executed related to the loaded optical disc.

By applying the finalization process to an optical disc with already written data, already written data will not be lost and nor data addition is possible. Even if a file system is used which can apparently rewrite data by using a data addition type medium such as CD-R, the already written data cannot be changed physically and logically. Therefore, already written data will not be falsified or altered. Neither a write operation nor a write-once operation is possible for an optical disc with the data protection function after the finalization process is executed. This optical disc is therefore equivalent to a read-only medium so that it is applicable to a medium used for data distribution purposes or the like. The application field can therefore be broadened.

(6) When a format command is received from a user or a host after the optical disc with the data protection function is loaded, a format operation is not executed until it is confirmed that the optical disc with the data protection function is unformatted.

There is no possibility that data already written in the optical disc may be erased by the optical disc drive system of this invention even if various means are used. Reliability of already written data can be improved considerably.

(7) The optical disc with the data protection function has an error correction block having a size of a plurality of sectors, and a write command from a user or a host is not executed if the write command contains a size smaller than the size of the error correction block.

A conventional optical disc drive system receives a data write command containing a unit (sector) smaller than the unit (error correction block) of error correction for data written in an optical disc. Therefore, a read-modify-write process is necessary wherein before data is written in a single sector, data in nearby sectors is first read and thereafter a portion of the read data is replaced by written data to write new data. If the read-modify-write operation fails, there is a risk that already written data may be lost. By not processing the write command from the host or user containing the size smaller than the error correction block size, the read-modify-write process is not necessary. Accordingly, even if an abnormal event such as a power failure occurs, there is no risk of losing already written data and a high reliability is retained.

(8) In an optical disc drive system with the data protection function for preventing user data rewrite, if any defect is detected during data read or write, management data in a defect management area of the optical disc is updated.

While data miss-erase or overwrite is prevented, the defective sector is subjected to the replacement process by using the rewrite function so that reliability can be improved without lowering the performance.

(9) An optical disc with a data protection function is provided which has a same physical format as a standard optical disc and a different range of address data assigned to a plurality of data recording unit areas from the standard optical disc, the standard optical disc having a plurality of unrewritable address data and the data recording unit areas identified by the address data and being freely rewritable.

With this optical disc, even if an optical disc with the data protection function is driven with a conventional optical disc drive system which cannot recognize the data protection function, the conventional optical disc drive system cannot access the target data write area because the target address does not exist at the position expected by the conventional optical disc drive system. There is therefore no risk that the conventional optical disc drive system without the data protection function may erroneously destroy data through erase or overwrite. A high reliability of the data protection function can therefore be improved. Further, the address data of a conventional optical disc is not overlapped with and is perfectly different from the address data of the optical disc with the data protection function. By utilizing this point, the conventional optical disc and the optical disc with the data protection function can be easily discriminated.

DETAILED DESCRIPTION OF THE EMBODIMENTS

1st Embodiment

Operation of Optical Disc Drive System with Data Protection Function

An embodiment of an optical disc drive system of this invention will be described with reference to FIG. 2.

Figure 2:
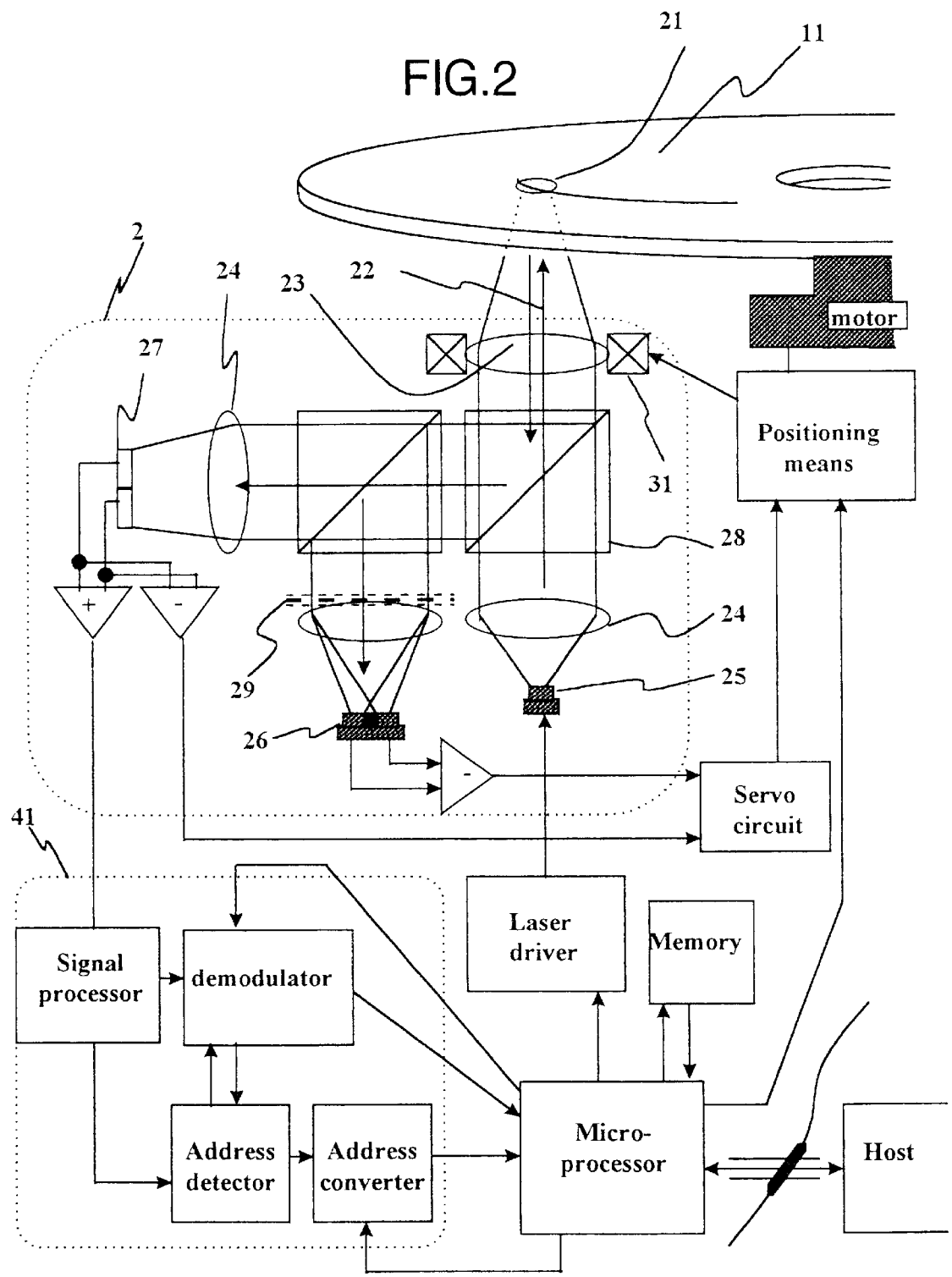
FIG. 2 is a block diagram showing a system according to an embodiment of the invention.
Figure 3:
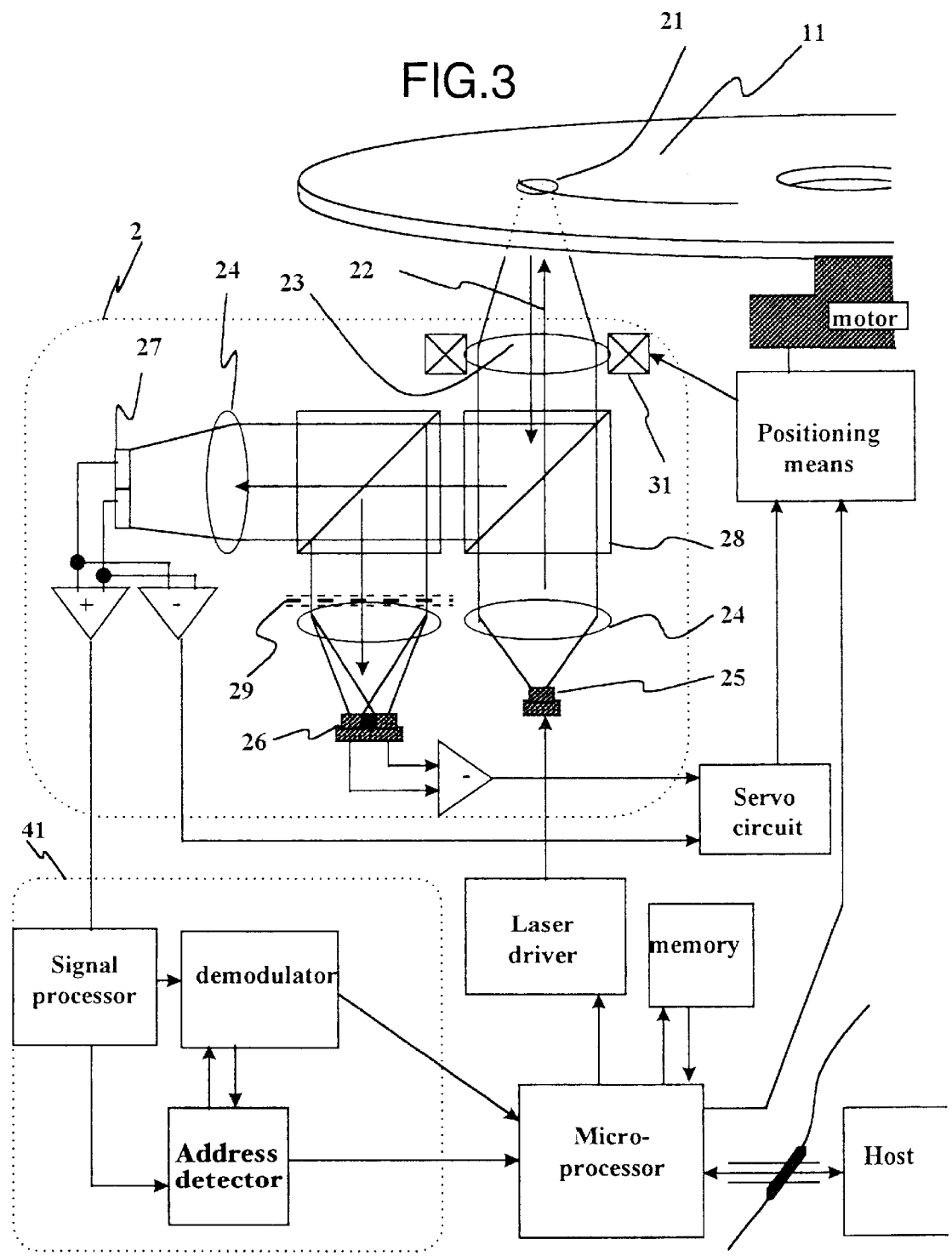
FIG. 3 is a block diagram showing a conventional system.

FIG. 2 is a block diagram showing an optical disc drive system of this invention (in conformity with DVD-RAM specifications and added with a data protection function for preventing erase and overwrite of written data). Light emitted from a laser 25 (about 660 nm in wavelength for DVD-RAM) constituting a portion of an optical head 2 passes through a collimator lens 24 to be collimated to parallel light beams 22. A light beam 22 is focused upon an optical disk 11 via an objective lens 23 to form a spot 21. The reflected light beam 22 is sent to a servo detector 26 and a signal detector 27 via a beam splitter 28 and a hologram device 29. Signals detected with the detectors are added or subtracted to form servo signals such as a tracking error signal and a focus error signal which are input to a servo circuit. In accordance with the input tracking error signal and focus error signal, the servo circuit controls the positions of the objective lens 31 and optical head 2 to set the optical spot 21 to a target read/write area. An addition signal of signals output from the detector 27 is input to a signal reproduction block 41. The input signal is subjected to filtering and equalizing by a signal processing circuit to be digitized thereafter. This digital signal is processed by an address detector and a demodulator. Address data is obtained by the address detector. In this invention, this address data is used after being converted by an address converter. This address converter operates differently between the case that a loaded medium is a conventional DVD-RAM without a data protection function and the case that a loaded medium is an optical disc with the data protection function of this invention. The former case uses the address data itself without conversion, whereas the latter case uses a value obtained by subtracting a constant (in this embodiment 400000h) from the address data. In this embodiment, optical disks used have a start physical address of a user data area of 431000h for optical discs with the data protection function, and have a start physical address of a user data area of 31000h for conventional DVD-RAMs. In addition, optical discs used satisfy PN=PP−400000h where PP is a physical address of a DVD-RAM disk with the data protection function and PN is a corresponding physical address of a conventional DVD-RAM. The address of DVD-RAM with the data protection function after the address conversion is therefore the same as that of conventional DVD-RAM, so that the optical disc drive system of this embodiment can easily process both types of discs. In accordance with the address data, a microprocessor calculates the position of the optical spot 21 on the optical disc 11 and controls an automatic positioning means to move the optical head 2 and optical spot 21 to the target read/write unit area (sector).

If a command from a host to the microprocessor is a read command and if an optical disc with the data protection function is loaded, the microprocessor receives write data from the host and stores it in a memory, and controls the automatic positioning means to move the optical spot 21 to the target write area. After the microprocessor confirms from the address signal supplied from the signal reproduction block 41 that the optical spot is correctly positioned at the data write area, the microprocessor executes a read process for the target write area to check whether data is already stored therein. If already stored, the write operation is intercepted and the existence of already stored data is notified to the host. Only when the data is still not stored, the microcomputer again controls the automatic positioning means to move the optical spot 21 to the target write area and controls a laser driver and the like to write the data stored beforehand in the memory into the target write area.

Figure 4:
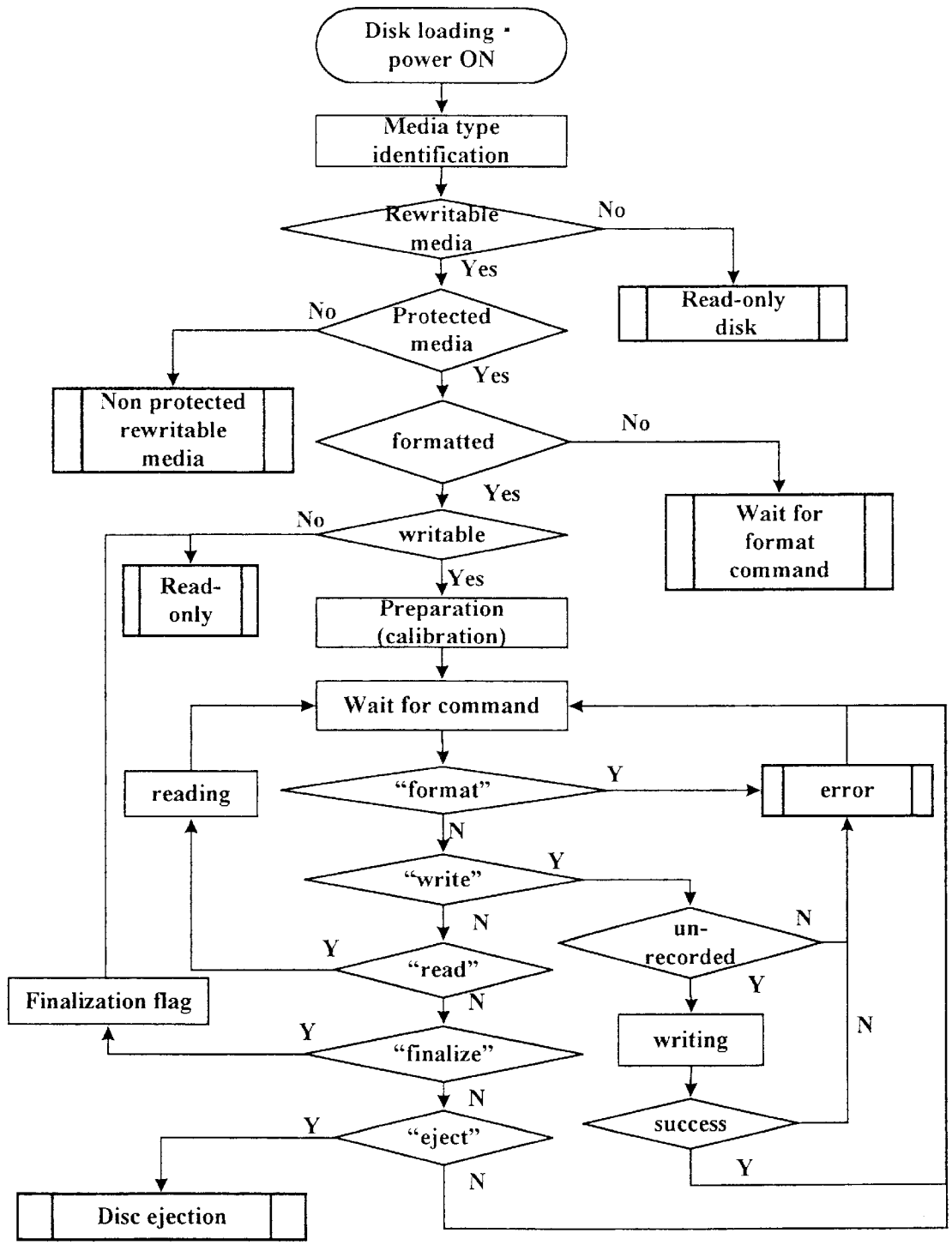
FIG. 4 is a flow chart illustrating the operation to be executed by the system of the embodiment.

FIG. 4 is a flow chart illustrating the operation of the optical disc drive system of this embodiment.

Figure 5:
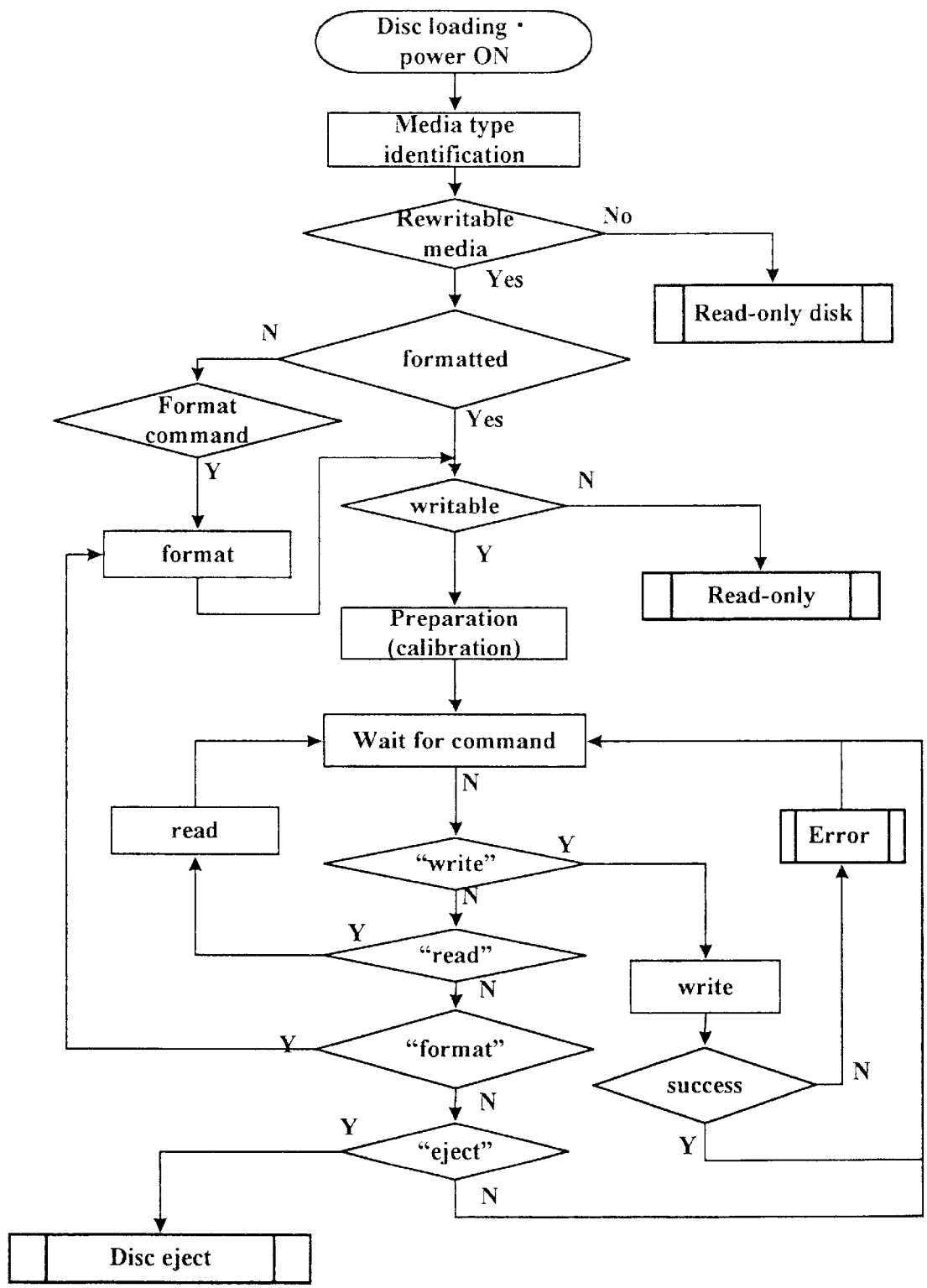
FIG. 5 is a flow chart illustrating the operation to be executed by the conventional system.

As a disc is loaded or a power of the optical disc drive system is turned on, the optical disc drive system first executes a process of identifying the type of the medium. This system generally has a read function not only for DVD-RAM media but also for read-only type media such as CD-ROM and DVD-ROM. Therefore, the optical disc drive system first executes the identification process to identify the type of the loaded medium. The identification process changes with each system. In this embodiment, the medium type is identified first roughly from a reflectivity and the analog characteristics of the reproduced signal such as a focus error signal, and after the gain and the like are adjusted, lastly from the contents (data) read with the optical spot from a disc physical information area in a disk substrate. Since information on a presence/absence of the data protection function is also recorded in the disc physical information area, the presence/absence can be determined at the same time. If it is judged that the loaded medium is a rewritable type medium without the data protection function, the process similar to that of a conventional optical disc drive system shown in FIG. 5 is executed. The details thereof are therefore not given.

If the medium type is identified as a rewritable type optical disc with the data protection function, the optical disc drive system reads data recorded in a defect management area to check whether the optical disc is already formatted. If unformatted, it stands by until a format command is supplied from the host or user.

If formatted, the optical disc drive system executes a read/write preparation process such as a calibration process and a logical consistency process, and thereafter waits for a command from the host or user. Upon reception of any command, the optical disc drive system checks the type of the command. If it is a write command, a write process is executed, whereas if it is a read command, a format command or an eject command, then a corresponding process is executed.

Upon reception of the write command, it is checked as describe earlier whether data is already written in the target read area (blank detection). If already written, this effect is notified to the host and the write operation is not executed. Only when it is judged that data is not written, the write process is executed. The write process for the blank write area is usually terminated normally. However, if the write operation were failed from unexpected reasons, an error process such as a retry process and a replacement process is executed. In practice, after the write process, the written data is read to verify whether the data was correctly written, and if necessary the replacement process using other read/write unit areas is executed. In this manner, the reliability of written data is improved. Management information on reassignment of read/write unit areas is recorded in a specific area (defect management area) of the disc. This defect management information is updated even if the information is already written.

In this embodiment, the write command to be received from the host is required to contain the same size as that of an error correction block of an optical disc. In this embodiment, the size of the error correction block is 16 sectors, i.e., about 32 KB, similar to the base format of DVD-RAM. Therefore, only the write command containing a multiple of 16 as the write start sector address and a multiple of 16 as the number of write sectors is permitted. The reason for setting the write command in this manner is given in the following. If a write command containing the size shorter than the error correction block size, e.g., a write command containing one sector length, is received, the optical disc drive system is required to execute a read-modify-write process of first executing a read process for 16 sectors near the designated one sector to read data, and modifying a portion of read data with the write data to write the write data. If the read-modify-write operation fails, there is a risk that already written data may be lost. By not processing the write command from the host or user containing the size smaller than the error correction block size, the read-modify-write process is not necessary. Accordingly, even if an abnormal event such as a power failure occurs, there is no risk of losing already written data. In this embodiment, since a high reliability is retained, the write command other than the error correction block unit is not accepted. For data read, there is no risk of data loss so that there is no limit in the number of read sectors.

If the loaded medium is an optical disc with the data protection function and a format command is received, the format process is not executed unless the disc is unformatted. Already written data will not therefore be erased by the format process.

In the manner described above, an optical disc drive system with the data protection function and an improved reliability of DVD-RAM can be realized. In this system of the embodiment, the system checks whether already written data exists in the target write area. Accordingly, important written data will not be erased or altered even if there is miss-operation by a user or a failure by the host.

2nd Embodiment

Difference Between Optical Discs with and without Data Protection Function

Optical discs with the data protection function used had the reflectivity and read/write/rewrite characteristics all same as those of conventional optical discs (DVD-RAM) without the data protection function. Both optical discs with the data protection function and optical discs (DVD-RAM) without the data protection function can therefore be manufactured easily by using the same manufacture system.

For example, DVD-RAM specifications (2.6 GB, ISO/IEC16824) adopt a land and groove pattern as its data format and data is written in both spiral land and groove tracks. The land and groove are alternately arranged at each turn of the track. The track pitch is about 0.74 μm. Each track is divided into a plurality of sectors (integer number). This division number changes with a radius position. For example, the track is divided into 17 sectors at the innermost circumference (near at a radius of 24 mm) in the rewrite area, whereas it is divided into 40 sectors at the outermost circumference (near at a radius of 58 mm). Since the length of the outer circumference is longer than the inner circumference, the number of divisions is set larger at the outer circumference so that the length of each sector can be made generally equal both at the inner and outer circumferences. Each sector has a header field (read-only field) containing address data for identifying the sector and a data write field in which user data of 2048 bytes can be written. As described in U.S. Pat. No. 5,805,565, header fields are disposed in a zigzag shape at boundaries between the land and groove. As described in U.S. Pat. No. 5,936,933, the tracks are wobbled with a wobbling period of 1/232 of the length of each sector. According to the DVD-RAM specifications, the innermost circumference at the radius of 24 mm is set to 31000 hex, and the address is incremented by one for each sector. In an area inner than the radius of 24 mm, medium type identification data is written in the form of read-only pits.

According to the invention, the same data format as the DVD-RAM specifications is used, and the address of the innermost circumference is set to 431000 hex and the address is incremented by one for each sector. The contents of the medium type identification data are also changed partially.

A difference of the flag values and address numbers between an optical disc with the data protection function and an optical disc without the data protection function resides in that the media type identification data (identification code) written in the read-only area or control area is different (conventionally 0001b, in this invention 0101b) and that the address data in the data write area is defined as PP=PN+400000h where PP is a physical address of a DVD-RAM disk with the data protection function and PN is a corresponding physical address of a conventional DVD-RAM.

The reason for setting the value of 400000h is that the largest value of the physical address of a conventional DVD-RAM is about 270000h which is smaller than 400000h. Discs of two types can be discriminated from a difference of the address space. Since addition of this equation does not generate a carry, the addition is equivalent to logical sum. Therefore, in order to calculate PN from PP, only the second most significant bit of binary 32 bits is masked. Only this bit may be checked for discrimination between two types so that the process to be executed by the system can be simplified considerably.

A finalization process data area for writing finalization process data may be added to the optical disc with the data protection function.

In this embodiment, although the DVD-RAM specifications for 2.6 GB are adopted, the invention is not limited only thereto. For example, the invention is also applicable to the DVD-RAM specifications for higher density 4.7 GB. With this high density DVD-RAM specifications for 4.7 GB, the track pitch is 0.615 μm and the number of sectors of one track is larger. In spite of the difference, only the changes between optical discs of the 4.7 GB DVD-RAM specifications and this invention are assignment of address data and the contents in the read-only area.

3rd Embodiment

Figure 6:
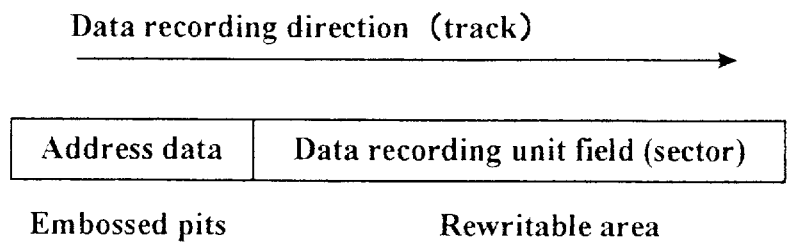
FIG. 6 is a diagram showing the format of address data according to the invention.
Figure 7:
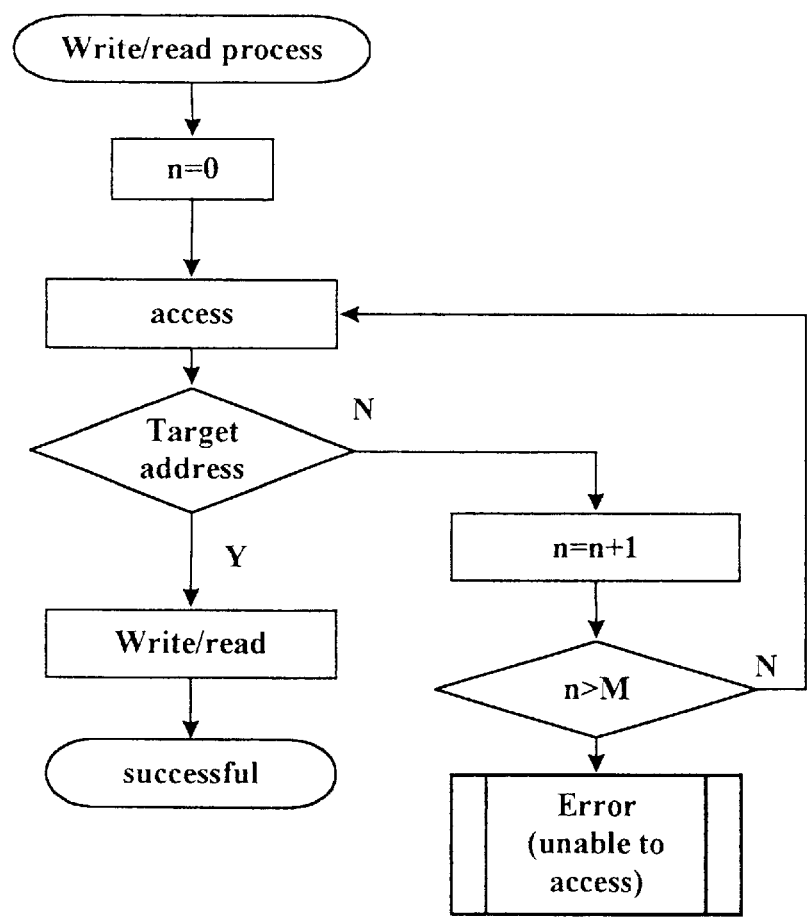
FIG. 7 is a flow chart illustrating a data protection operation by using a conventional apparatus.

Insertion of Optical Disc with Data Protection Function into Conventional System Even if an optical disc with the data protection function is used with a conventional optical disc drive system, recorded data can be protected reliably. This will be described with reference to FIG. 7. In an optical disc drive system, in order to correctly access data, the position of an optical spot is detected by reading the address data written in the address field at the start of the data write area (sector) as shown in FIG. 6 and the optical spot is moved to the target data recording unit area, to thereby execute a so-called seek operation. A sequence of this seek operation is illustrated in the flow chart of FIG. 7. In a conventional optical disc drive system, when data is written in or read from an optical disk with the data protection function, a target address is first searched. However, the optical disc with the data protection function does not have the address write unit same as that of an optical disc standardized by DVD-RAM specifications. Therefore, after the seek operation is repeated by a predetermined number of times (changed with each system), the conventional system judges the optical disc as a defective disc with no address and executes an error process. During such operations, data will not be written erroneously in any area, because the write operation is not executed unless the target write address is detected.

Namely, record data in an optical disc with the data protection function of this invention can be protected safely even if a conventional system is used, and the expansion function such as a write-once function (data protection function) can be realized.

Figure 1:
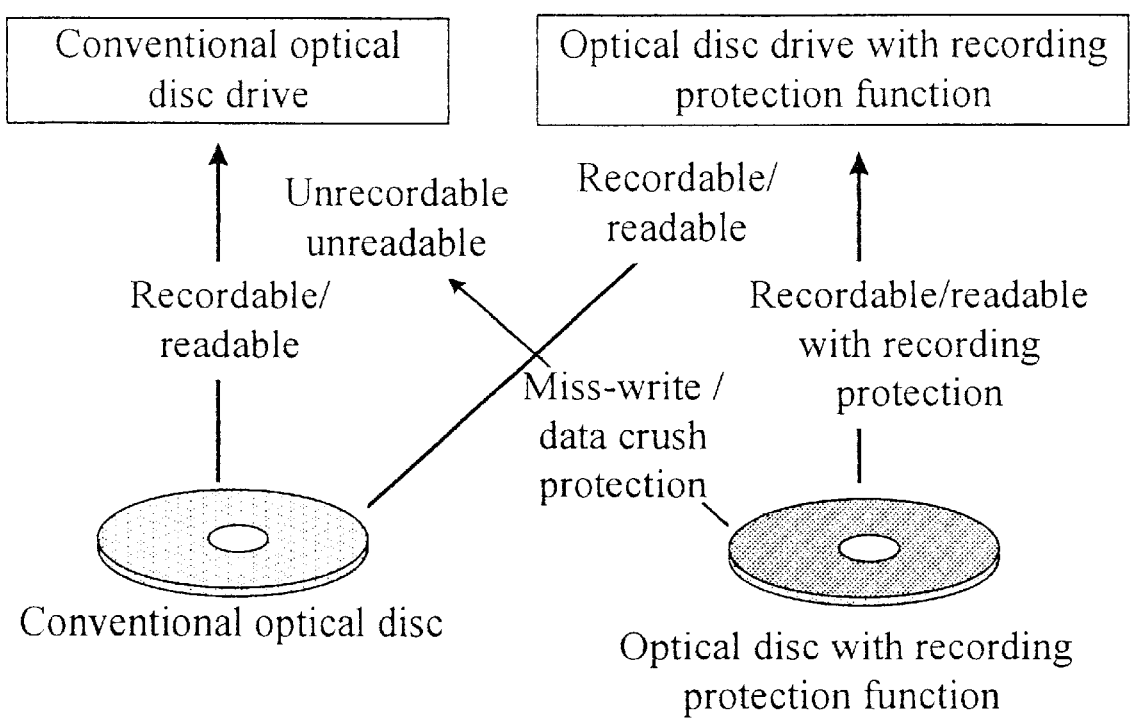
FIG. 1 is a conceptual diagram illustrating the object and effects of the invention.

FIG. 1 summarizes the operations to be executed when a conventional optical disc (medium) or an optical disc (medium) with the data protection function is inserted either into a conventional optical disc drive system (apparatus) or into an optical disc drive system (apparatus) with the data protection function of this invention. The optical disc drive system with the data protection function can use both types of media, a conventional optical disc and an optical disc with the data protection function, in a manner matching the functions of each medium. The conventional optical disc drive system cannot read data from and write data into a medium with the data protection function of this invention, although it can read and write a conventional medium.

The function of data protection is completely guaranteed.

4th Embodiment

Finalization Process

A finalization process function is added to the system of the first embodiment in order to provide another data protection method. As shown in the lower part of FIG. 4, upon reception of a "finalize" command from the host, an optical disc drive system of this embodiment writes finalization data in an optical disc with the data protection function.

If the optical disc drive system with the data protection function of this embodiment detects a "finalization" flag, the system will not execute the write operation to the medium but deals the medium as a read-only medium.

If the finalization operation is executed for an optical disc already written with data, the data will not be lost nor write-once is possible. Even if a file system is used which can apparently rewrite data by using a write-once type medium such as CD-R, the already written data cannot be changed physically and logically. Therefore, already written data will not be falsified or altered. Neither a write operation nor a write-once operation is possible for an optical disc with the data protection function after the finalization process is executed. This optical disc is therefore equivalent to a read-only medium so that it is applicable to a medium used for data distribution purposes or the like. The application field can therefore be broadened.

As described above, the invention can provide a secure optical disc drive system capable of easily realizing an expansion function such as a data protection function without changing hardware and physical specifications, and eliminating a possibility that a conventional system not recognizing this expansion function may erase or alter data.

The advantages of the embodiments are not limited to those described above. For example, it is not necessarily required to form a discrete address converter of the first embodiment, but the function of the address converter may be realized by software using a microprocessor. In the above embodiments, although DVD-RAM is used as an example of a conventional optical disc, other types of rewritable media may also be used basically.

Hardware and physical specifications are not almost required to be changed to realize the data protection function. Therefore, the expansion function such as the data protection function can be easily realized. A secure optical disc drive system can be provided which can eliminate a possibility that a conventional system not recognizing this expansion function may erase or alter data.

What is claimed is:

1. An optical disc drive system capable of processing both a rewritable optical disc having a plurality of data recording unit areas freely rewritable and an optical disc with a data protection function having the same format as the rewritable optical disc and having a different range of address data to limit data rewrite or data write-once, wherein said optical disc drive system does not execute a write operation to said optical disc with said data protection when finalization data is recorded.

2. An optical disc drive system according to claim 1, comprising an address detector for detecting an address of an optical disc loaded in the optical disc drive system and an address converter for processing a signal output from said address detector.

3. An optical disc drive system according to claim 1, wherein said address converter executes an arithmetic operation for the signal output from said address detector by using a constant value, when the optical disc with the data protection function is loaded.

4. An optical disc drive system according to claim 3, wherein the arithmetic operation is subtraction.

5. An optical disc drive system according to claim 1, further comprising a controller responsive to a user data write command from a user or a host for controlling an overwrite protection function of executing a read operation for reading the data recording unit area when user data is to be written in the data recording unit area of the optical disc with the data protection function, inhibiting data write if user data is already written in the data recording unit area, and writing the user data in the data recording unit area if user data is not written in the data recording unit area.

6. An optical disc drive system according to claim 1, further comprising means for reading a control data area other than a ordinary user area of the optical disc with the data protection function when the optical disc with the data protection function is loaded, the control data area storing information for discriminating the optical disc with the data protection function from the rewritable optical disc.

7. An optical disc drive system according to claim 1, wherein said controller controls to write finalization data in the optical disc with the data protection function upon reception of a command from a user or a host and to confirm a presence/absence of the finalization data when an optical disk is loaded, and if there is the finalization data, neither a write-once operation nor a rewrite operation is executed related to the loaded optical disc.

8. An optical disc drive system according to claim 1, wherein when a format command is received from a user or a host after the optical disc with the data protection function is loaded, a format operation is not executed until it is confirmed that the optical disc with the data protection function is unformatted.

9. An optical disc drive system according to claim 1, wherein the optical disc with the data protection function has an error correction block having a size of a plurality of sectors, and a write command from a user or a host is not executed if the write command contains a data size smaller than the size of the error correction block.

10. An optical disc drive system according to claim 1, wherein if any defect is detected in the optical disc with the data protection function, management data in a defect management area of the optical disc with the data protection function is updated.

11. An optical disc with a data protection function, having a same physical format as a standard optical disc and a different range of address data assigned to a plurality of data recording unit areas from the standard optical disc, the standard optical disc having a plurality of unrewritable address data and the data recording unit areas identified by the address data and being freely rewritable, wherein when finalization data is recorded in said optical disc with said data protection function, said finalization data prevents a write operation from being executed.

12. An optical disc according to claim 11, wherein the address data of the optical disc is obtained through an arithmetic operation of address data of the standard optical disc by using a constant value.

13. An optical disc according to claim 11, wherein data for discriminating the optical disc from the standard optical disc is recorded in a control data area outside of a user area.

14. An optical disc according to claim 12, wherein the arithmetic operation is addition.

* * * * *